June 30, 1964     J. BRETON     3,139,309

LOAD-EQUALIZING DEVICES FOR TWIN WHEELS

Filed April 9, 1962

Inventor:
Jacques Breton 3,139,309
LOAD-EQUALIZING DEVICES FOR TWIN WHEELS
Jacques Breton, Bourg-la-Reine, France, assignor to Dunlop Rubber Company Limited, London County, England, a British company
Filed Apr. 9, 1962, Ser. No. 185,887
8 Claims. (Cl. 301—36)

The present invention relates to twin wheels for vehicles and particularly to the equalization of the load between the tires of the twin wheels when the vehicle travels on cambered roads.

It is known that when a vehicle having an axle-carrying twin wheel travels on roads with convex camber, the whole of the load tends to be carried on the axially inner wheels of each pair. It has already been proposed to remedy this drawback by mounting the whole of the twin wheel assembly on the axle by means of resilient devices, in such a way that this assembly can pivot about an imaginary axis, parallel to the longitudinal axis of the vehicle and passing approximately through the center of the wheel assembly. Such a mounting, being resilient, has the drawback of allowing the whole wheel assembly to move transversely of the vehicle.

The object of the present invention is to provide a twin wheel assembly having an alternative load equalizing device to the above-mentioned device.

According to the present invention a twin wheel assembly comprises a rotatable hub, one wheel secured rigidly thereto and the second wheel secured resiliently to the hub to permit relative displacement of the axes of rotation of the two wheels.

Preferably, since the majority of roads have a convex camber, i.e. have a hump in the middle of the road, the outer wheel of the two is secured rigidly to the hub while the inner is mounted resiliently thereon.

The inner wheel is for preference mounted between the hub and the outer wheel and is resiliently secured to both by an annular resilient element bonded to the inner wheel and secured to the hub and outer wheel.

The invention will now be described with reference to the accompanying drawings of which:

Figure 1:
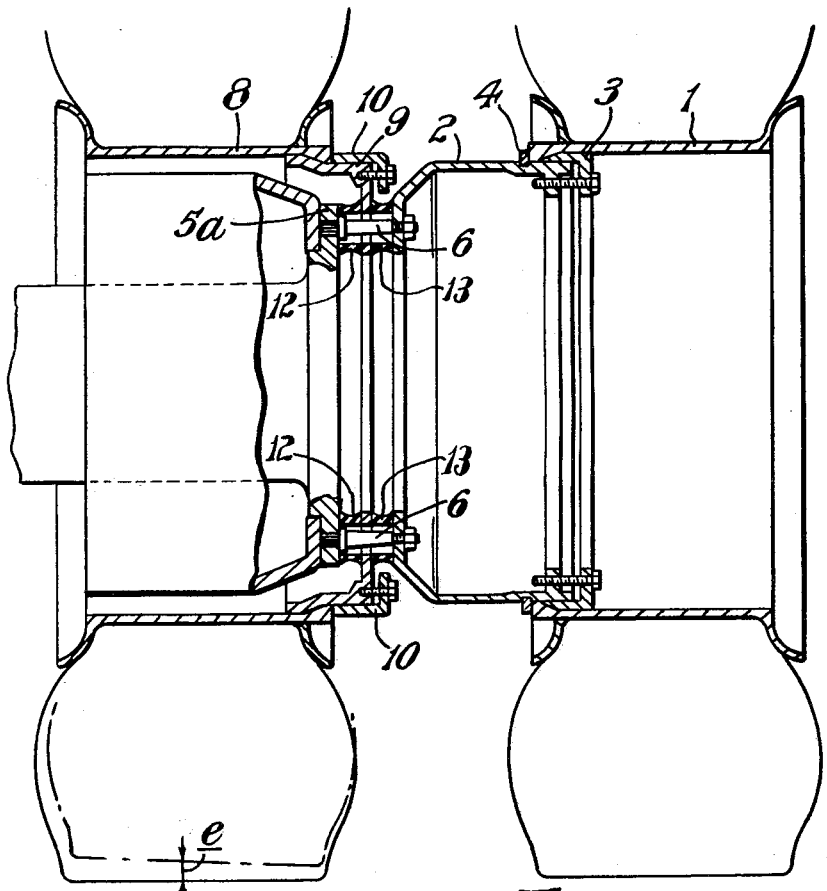
FIGURE 1 shows a part section, on a vertical plane through a twin wheel assembly according to the invention.

One wheel of the twin wheel assembly is constituted by an outboard wheel rim 1 and an annular outboard supporting member 2 and these are secured together by clips 3 which press on the axial end of the rim 1 into abutment with a detachable ring 4 located in an annular groove in the support 2.

An axle comprises a rotatable support 5 having a radially outwardly extending flange 5a. Studs 6 positioned at circumferentially spaced intervals are secured to the flange 5a and protrude axially outwardly therefrom as an unthreaded portion 6a which is then stepped in diameter to a threaded portion to form a shoulder. The annular outboard supporting member 2 has a radially-inwardly-extending flange and this is secured in abutment with the shoulders by nuts 7. Thus the outboard rim 1 and the annular outboard supporting member 2 are secured rigidly to the axle 5 by the studs 6 and nuts 7.

Figures 2, 3:
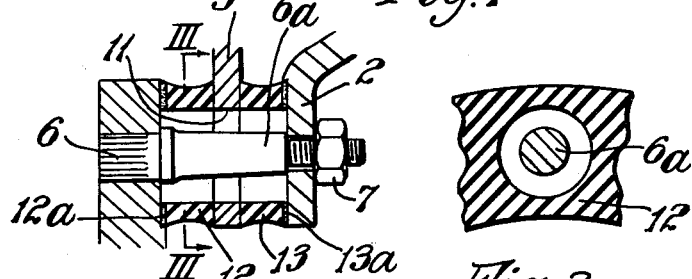
FIGURE 2 shows an enlarged cross-sectional detail of the attachment of the assembly.
FIGURE 3 is a view on section line III—III of FIGURE 2 in the direction of the arrows.

The other or inboard wheel of the twin wheel assembly is constituted by a wheel rim 8 and an annular inboard supporting member 9 which are secured together by clips 10. The smallest diameter of the rim 8 is sufficiently large to enable the rim 8 to pass over the annular outboard supporting member 2 when the ring 4 has been removed. This means that both rims can be removed without interfering with the flange 5a and its surrounding parts. At the radially inward end of the annular inboard supporting member 9 holes 11 (see FIGURE 2) are formed to enable the stud 6 to pass through them with considerable clearance between the stud and support 9.

Resilient elements 12 and 13 are bonded to each side of the inboard supporting member 9 on an annular area which includes the holes 11. The elements comprise annular rubber rings perforated at locations complementary to the holes 11 (see FIGURE 3) with holes of approximately the same size as holes 11.

The faces of the elements 12 and 13 presented away from the inboard supporting member 9 are adhered to rings 12a and 13a. Tightening of the nuts 7 on assembly compresses the resilient elements 12 and 13 from their undeformed state.

The operation of the assembly which has just been described is as follows:

When travelling on a cambered road, the inside rim 8 rises and the forces thereon are balanced by the resilient elements 12 and 13 which act in shear.

If $r$ denotes the rigidity of the resilient elements in the vertical plane and $e$ (FIGURE 1) the value of the vertical displacement of the rim 8, due to the camber of the road, the force which the rim 8 sustains is given by the relation $$F_1 = e \times r$$

If $Q/2$ is the total load of the twin wheel assembly, in order that the forces $F_1$ and $F_2$ acting on the two wheels may be equal $$F_1 = F_2 = e \times r = Q/4$$

Consequently:

$$r = Q/4e$$

The diameter of the holes 11 in the annular support 9 must be at least equal to the diameter of the stud 6 increased by twice the maximum value of the displacement $e$ allowed for the rim 8.

The resilient elements need not be annular but may comprise a number of blocks of rubber or like resilient material.

Having now described my invention, what I claim is:

1. A twin wheel assembly comprising a rotatable support having a flange extending in a plane normal to the axis of said support, an outboard supporting member having a flange parallel to and spaced from said flange of said rotatable support, an inboard supporting member having a flange between and spaced from the flange of the rotatable support and the flange of the outboard supporting member, an outboard wheel rim secured to said outboard supporting member, an inboard wheel rim secured to said inboard supporting member, means for securing said outboard supporting member rigidly to said rotatable support and resilient means between said flange of said rotatable support and the flanges of said inboard and said outboard members and securing the flange of said inboard supporting member resiliently to said flanges of said outboard member and said rotatable support to resiliently hold said inboard wheel rim coaxial to said rotatable supporting member and to be deflected out of coaxial relation to said rotatable supporting member.

2. The twin wheel assembly of claim 1 in which said means for securing said outboard supporting member to said rotatable support comprises a series of studs mounted on the flange of said rotatable support in positions spaced about the axis of said rotatable support and spanning the space between said flange and the flange of the outboard supporting member and secured to the flange of said outboard supporting member.

3. The twin wheel assembly of claim 2 in which said resilient elements comprise resilient rings of rubber having holes encircling said studs.

4. The twin assembly of claim 2 in which said wheel rims are detachably secured to their respective flanges.

5. The twin wheel assembly of claim 2 in which said resilient elements comprise a flat annular disc of rubber composition.

6. The twin wheel assembly of claim 2 in which said resilient elements comprise a series of rubber blocks.

7. A twin wheel assembly comprising a rotatable support having a flange extending in a plane normal to the axis of said support, an outboard supporting member having a flange parallel to and spaced from said flange of said rotatable support, an inboard supporting member having a flange between and spaced from the flange of the rotatable support and the flange of the outboard supporting member, an outboard wheel rim secured to said outboard supporting member, an inboard wheel rim secured to said inboard supporting member, a series of studs mounted on the flange of said rotatable support in positions spaced about the axis of said rotatable support and protruding in an axial direction outwardly from the flange of said rotatable support and spanning the space between said flange of said rotatable member and the flange of the outboard supporting member and having shoulders spaced from said flange of said rotatable member and to which said outboard supporting member is secured rigidly in abutment with said shoulders in spaced relation to said rotatable support to secure said outboard supporting member rigidly to said rotatable support with the flange of said outboard support spaced from the flange of said rotatable support and resilient means securing the flange of said inboard supporting member resiliently to said flange of said outboard supporting member and to the flange of said rotatable support to hold said inboard wheel rim coaxial to said rotatable supporting member and to be deflected out of coaxial relation to said rotatable supporting member.

8. The twin wheel assembly of claim 7 in which the studs pass through holes in the inboard supporting member flange, the holes being of sufficient size to permit movement of the studs relative to said flange.

References Cited in the file of this patent

UNITED STATES PATENTS

| | | |
|---|---|---|
| 1,769,903 | Baker | July 1, 1930 |
| 1,964,105 | Bowen | June 26, 1934 |
| 2,252,862 | Rabe | Aug. 19, 1941 |
| 2,570,559 | Juergenson | Oct. 9, 1951 |
| 2,593,977 | Burrows | Apr. 22, 1952 |

FOREIGN PATENTS

| | | |
|---|---|---|
| 982,057 | France | Jan. 24, 1951 |